United States Patent [19]

Nishida et al.

[11] 4,161,920
[45] Jul. 24, 1979

[54] MOTOR CONTROL SYSTEM FOR ONE STITCH SEWING CONTROL OF A SEWING MACHINE

[75] Inventors: Koji Nishida, Nagoya; Taneichi Kawai, Anjyo; Shigemitsu Hamajima, Oobu; Nobuyoshi Nagura; Tsuneo Hida, both of Anjyo, all of Japan

[73] Assignee: Aisin Seiki Co., Ltd., Japan

[21] Appl. No.: 813,625

[22] Filed: Jul. 7, 1977

[30] Foreign Application Priority Data

Jul. 23, 1977 [JP] Japan .................. 52-88546

[51] Int. Cl.² .......................................... D05B 69/22
[52] U.S. Cl. .................................................. 112/275
[58] Field of Search ............... 112/275, 277; 318/468, 318/466

[56] References Cited

U.S. PATENT DOCUMENTS 3,622,854 11/1971 Imai et al. .................. 112/275 X
3,987,739 10/1976 Wurst et al. .................. 112/275 X

*Primary Examiner*—Peter Nerbun
*Attorney, Agent, or Firm*—Staas & Halsey

[57] ABSTRACT

A motor control system for one stitch sewing control of a sewing machine is disclosed. Motor speed is controlled by controlling the trigger phase of motor drive thyristors. Two needle position detectors are employed to detect the arrival of the sewing needle at predetermined halt positions. A pair of motor speed indication signal generator circuits, a pair of memory circuits and a start pulse generator circuit are employed. When the one stitch sewing mode is selected and the foot controller is forced down, the first memory circuit memorizes the start of one stitch sewing and energizes the first motor speed indication signal generator circuit so as to drive the motor of the sewing machine at a predetermined sewing speed. When the first needle position detector detects the arrival of the sewing needle at the lowered halt position, it deenergizes the first memory circuit and the first motor speed indication signal generator circuit, and energizes the second memory circuit for energizing the second motor speed indication signal generator circuit so as to drive the motor at a predetermined lower sewing speed. When the second needle position detector detects the arrival of the sewing needle at the raised halt position, it deenergizes the second memory circuit and the second motor speed indication signal generator circuit. Deenergization of the second memory circuit causes a brake command signal which activates a brake means.

19 Claims, 12 Drawing Figures

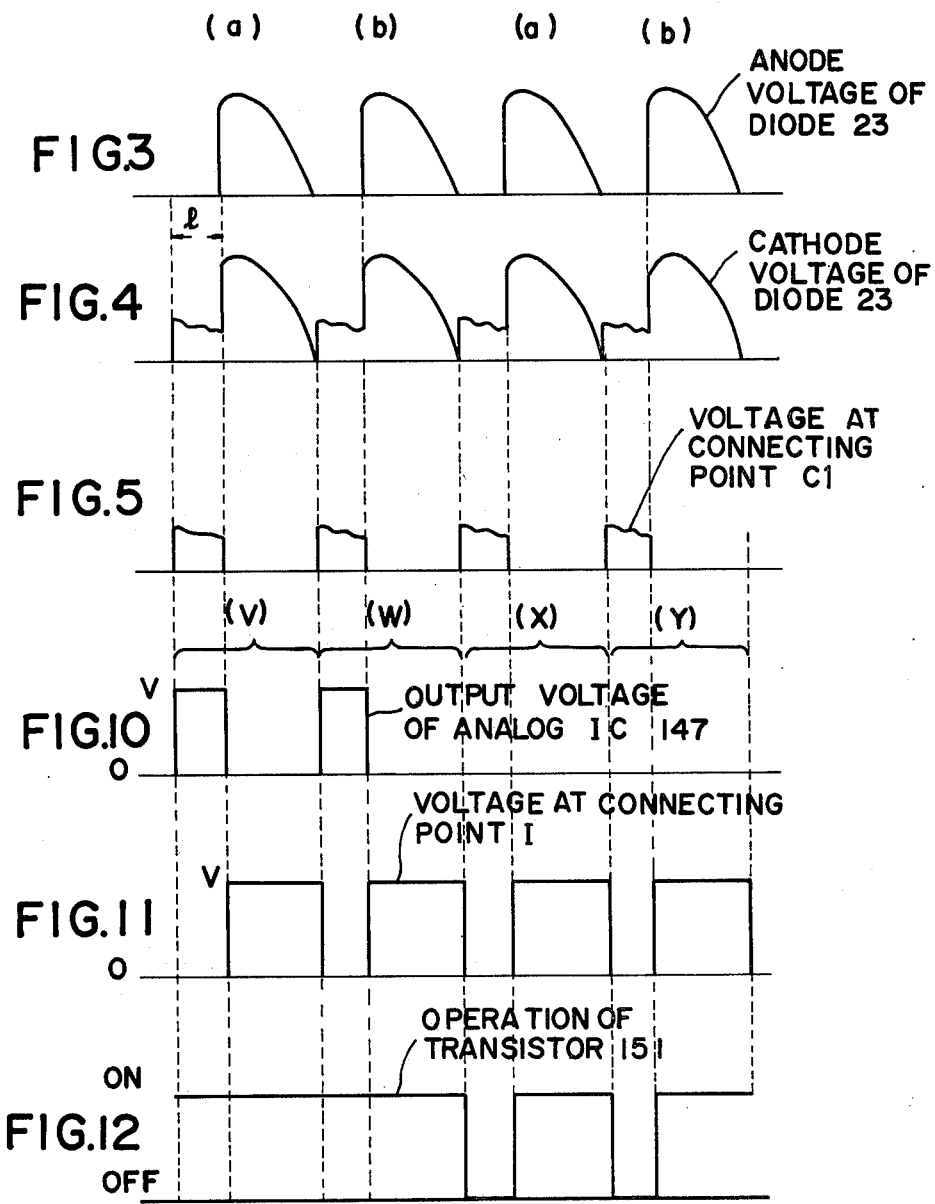

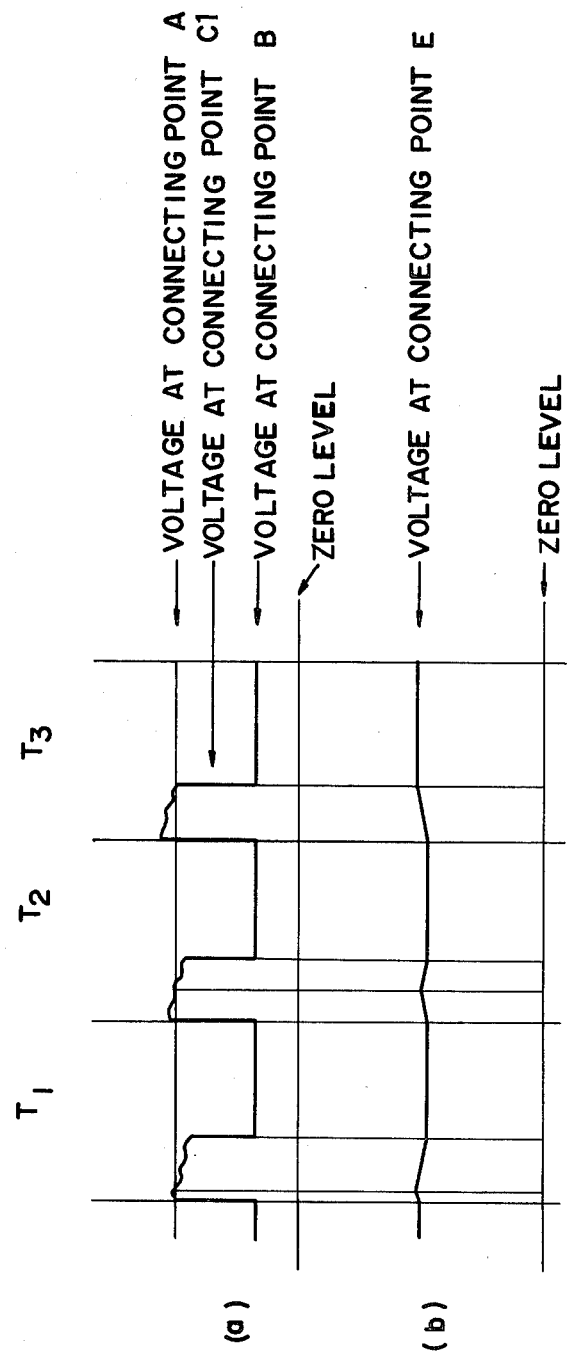

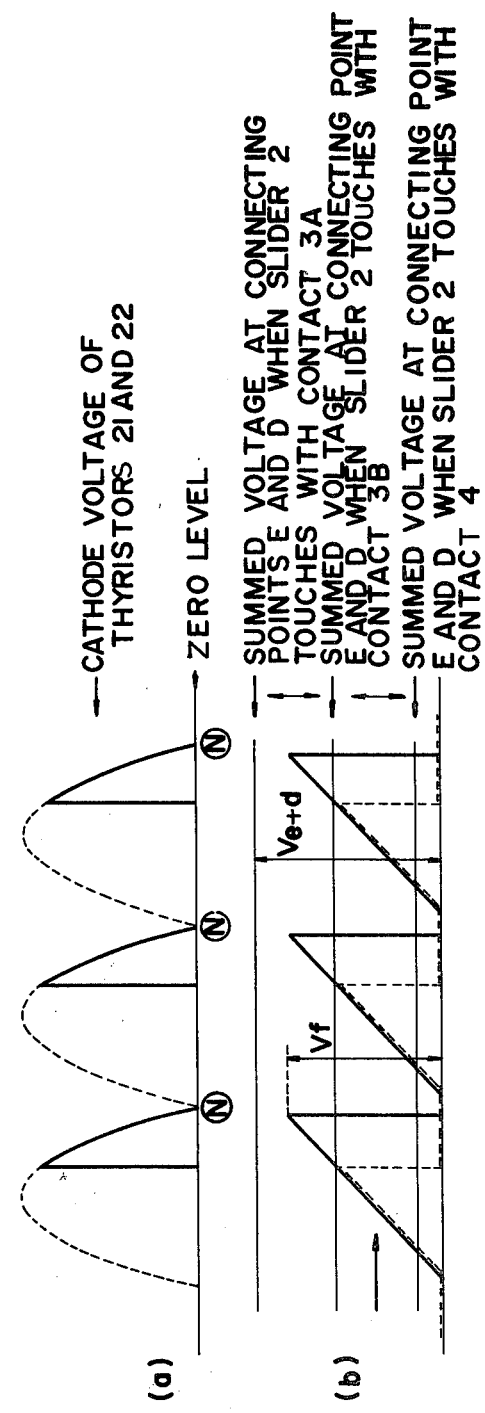

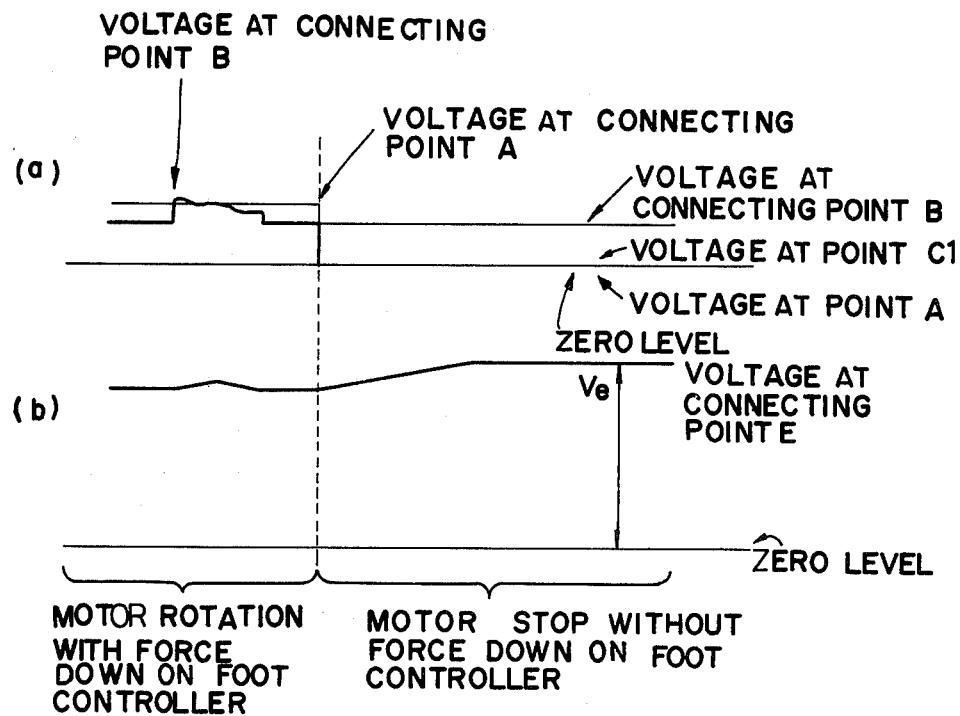
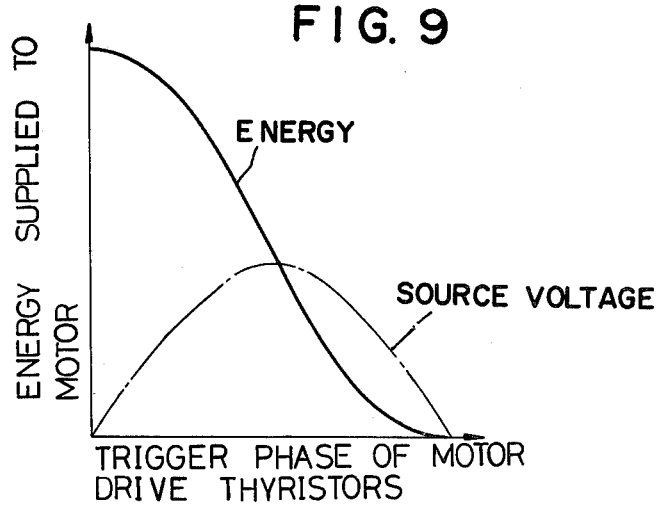

MOTOR CONTROL SYSTEM FOR ONE STITCH SEWING CONTROL OF A SEWING MACHINE

The subject matter of this application is related to the subject matters of applicants' copending applications, Ser. No. 813,624, filed July 7, 1977, and Ser. No. 813,626, filed July 7, 1977, which are assigned to the assignee of this application.

BACKGROUND OF THE INVENTION

The present invention relates to a motor control system for a sewing machine in which thyristors are employed for motor driving control. More particulary, the invention relates to a one stitch sewing control system for a sewing machine in which thyristors are employed for motor driving control.

A conventional motor control system for one stitch sewing, in which the motor is energized by selection of the one stitch sewing mode and downward force on the foot controller and stops after execution of the one stitch sewing operation, employs either a mechanical control means such as a one way clutch and stopper, or an electric control circuit which controls energization and deenergization of the motor in accordance with the movement of the sewing needle. The mechanical control means correctly controls the one stitch sewing. However, it has many mechanical components and produces mechanical impact shock and noise. Therefore it may be worn out after a relatively short life. Energization and deenergization of the motor by an electric circuit for one stitch sewing control also has some defects; stop control is relatively rough in high speed one stitch sewing, and motor speed should be low to stop the sewing needle correctly at a predetermined halt position after completion of a stitch.

SUMMARY OF THE INVENTION

It is therefore an object of the present invention to provide a motor control system for one stitch control of a sewing machine, which is compact and comprises a relatively small number of mechanical elements.

A further object of the present invention is to provide a motor control system for one stitch control of a sewing machine, which controls motor speed so as to stop the sewing needle at a predetermined halt position quickly and correctly in the one stitch sewing control mode.

Other objects of the invention will be apparent from the detailed description of the invention described hereinafter, referring the attached drawings.

According to the present invention, a motor control system for a sewing machine which comprises motor drive thyristors, a trigger phase control circuit for controlling the operation of the motor drive thyristors and a comparator circuit for generating a trigger phase indication signal to accelerate or decelerate motor speed to an indicated speed which corresponds to downward force on a foot controller further comprises, according to the present invention, a start detection circuit, first and second needle position detectors, first and second memory circuits, a one stitch sewing speed indication signal generator circuit and a predetermined constant trigger phase command signal generator circuit.

The start detection circuit generates a pulse when the one stitch sewing mode is selected and the foot controller is forced down to operate one stitch sewing. The first memory circuit is energized by the pulse and energizes the one stitch sewing speed indication signal generator circuit which in turn supplies a one stitch sewing speed indication signal to the comparator circuit. Therefore the motor drive thyristors are triggered to turn ON at a predetermined phase angle which corresponds to the one stitch sewing indication signal. Thus the motor will be energized to rotate at a predetermined higher speed. The first detector means detects the arival of the sewing needle at the lowered halt position and deenergizes the first memory circuit to deenergize the one stitch sewing speed indication signal generator circuit, deenergization of which causes energization of the second memory circuit to energize the predetermined constant trigger phase command signal generator circuit. Then a constant trigger phase command signal is applied to the comparator circuit to drive the motor at another predetermined constant speed which is low enough to allow the sewing needle to be smoothly stopped at the raised halt position. At the raised position of the sewing needle, the second needle position detector detects it and deenergizes the predetermined constant trigger phase command signal generator circuit, deenergization of which causes a brake command signal to be applied to a brake means. Thus the sewing needle stops at the raised halt position after one stitch sewing. The first speed of the motor, until the sewing needle arrives at the lowered halt position, may be predetermined at a high level by the one stitch sewing speed indication signal. The second speed of the motor, after the sewing needle arrives at the lowered halt position, may be predetermined at a low enough level to decelerate the motor's speed before the sewing needle comes to the raised halt position by the predetermined constant trigger phase command signal. Therefore the sewing needle starts to move at a relatively high speed and then it is decelerated to stop relatively smoothly and correctly.

BRIEF DESCRIPTION OF THE DRAWINGS

FIG. 3, FIG. 4 and FIG. 5 show signal waveforms at various points in FIG. 1, in which time axes are equivalent;

FIG. 6 shows signal waveforms at various points in FIG. 1 when the foot controller is forced down;

FIG. 7 and FIG. 8 show signal waveforms at various points in FIG. 1 when the foot controller is adjusted;

FIG. 9 shows the relationship between the trigger phase of the motor drive thyristors and energy supplied to the motor; and FIG. 10, FIG. 11 and FIG. 12 show operational timing of some parts of the circuit shown in FIG. 1.

DESCRIPTION OF THE PREFERRED EMBODIMENT

Figure 1:
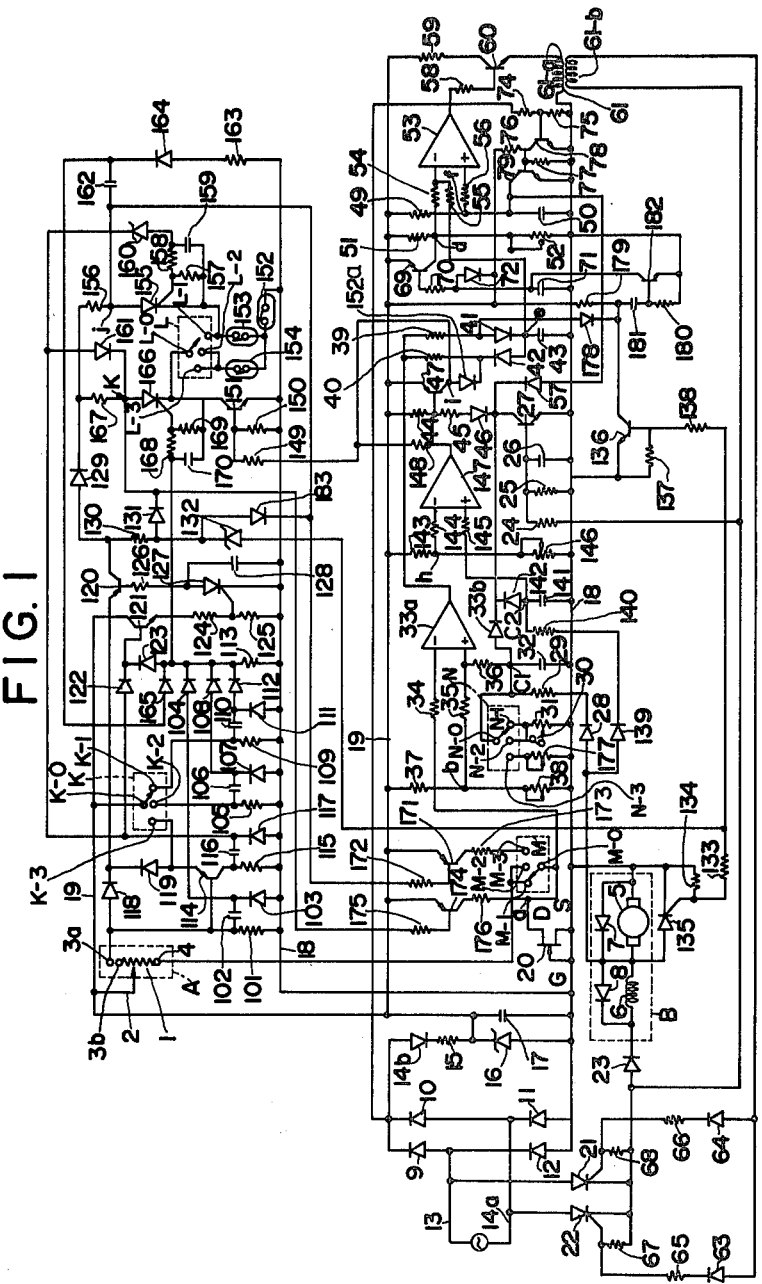
FIG. 1 is a circuit diagram of a preferred embodiment of the present invention.

Referring to FIG. 1, there is shown a preferred embodiment of the invention, which comprises circuit means for motor speed control, predetermined halt position control of the sewing needle, and one stitch sewing control. There is a variable resistor A in the foot controller. The variable resistor A comprises resistor 1 and slider 2 which moves in correspondance with downward force on the foot controller by an operator. The slider 2 touches contact 3a when the foot controller is not forced down by the operator (stop position). Assuming that the foot controller is depressed by the operator, the slider 2 at first touches contact 3b, then touches resistor 1, and at last touches contact 4 (motor drive position). Motor unit B comprises a rotor or armature 5, stator or field winding 6, and diodes 7 and 8. The field winding 6 is serially connected with armature 5. The diode 7 is connected in parallel with armature 5 so as to discharge the counter electromotive voltage in armature 5 when the source voltage to motor unit B is interrupted. The diode 8 is connected in parallel with filed winding 6 so as to discharge the counter electromotive voltage in field winding 6 when the source voltage to motor unit B is interrupted. Diodes 9, 10, 11 and 12 are connected to the AC voltage source through lines 13 and 14a in full wave rectifier form. The negative output line 18 from the diode full wave rectifier 9, 10, 11 and 12 is assumed to have a voltage reference level of zero. The positive output line from the diode full wave rectifier 9, 10, 11 and 12 is connected to the anode of diode 14b, which constitute a simple voltage regulator circuit with resistor 15, Zener diode 16 and capacitor 17. The positive voltage terminal of capacitor 17 supplies a constant voltage V to positive voltage line 19.

Figure 2A:
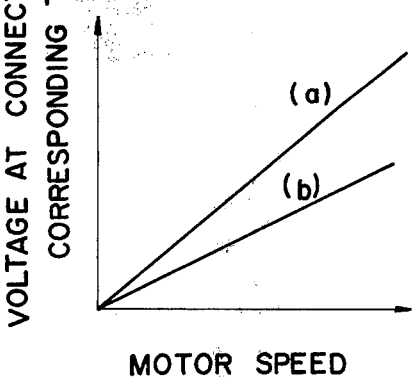
FIG. 2a is a graph which shows the relationship between motor speed and the motor speed signal at the connecting point (cl) denoted in FIG. 1.
Figure 2B:
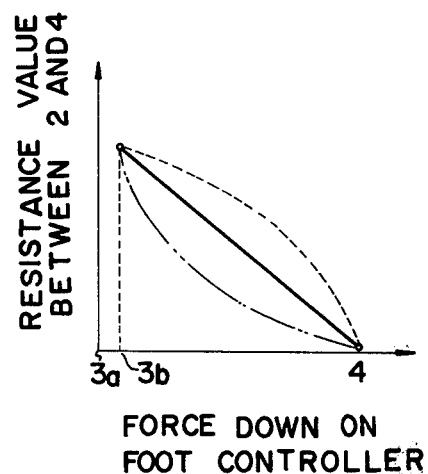
FIG. 2b is a graph which shows the relationship between downward force on the foot controller and the resistance value of the variable resistor in the foot controller.
Figure 2C:
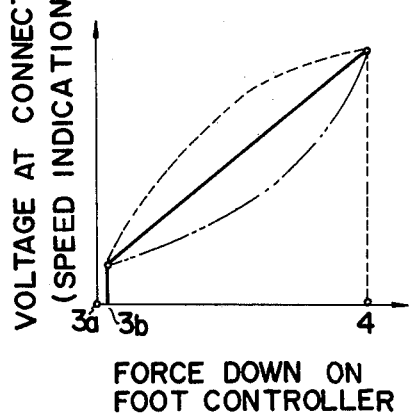
FIG. 2c is a graph which shows the relationship between downward force on the foot controller and the motor speed indication signal at the connecting point (a) denoted in FIG. 1.

An FET (Field Effect Transistor) 20 is connected to negative voltage line 18. Constant current is made to pass through drain D and source S of FET 20 by connecting gate G to source S and supplying a voltage which is above a predetermined threshold level between drain D and source S. Thus FET 20 operates as a constant current source. The drain S of FET 20 is connected to the positive constant voltage line 19 through the first mode selector switch M, contact 4, resistor 1 and slider 2. By this connection, the voltage drop between contact 4 and slider 2, and the voltage available at the first mode selector switch M is proportional to the position of slider 2 because of the constant current limitation of FET 20. When the foot controller is depressed gradually by an operator, the position of the slider 2 gradually approaches contact 4 and the resistance between slider 2 and contact 4 decreases gradually. This relationship is shown in FIG. 2b. The voltage at drain S of FET 20, i.e. the voltage at connecting point (a), corresponds to the resistance between slider 2 and contact 4. Thus the voltage at connecting point (a) changes in correspondance with the downward force on the foot controller, as shown in FIG. 2c. The voltage at connecting point (a) is the motor speed command signal, which will be described as the "motor speed indication signal". If the resistance distribution of the resistor 1 is not linear and/or movement of slider 2 is not linear in relation to downward force on the foot controller, the resistance value between slider 2 and contact 4, as well as the voltage at connecting point (a), will not be proportional to downward force on the foot controller, as shown by the dotted lines and phantom lines. Thus the acceleration and deceleration characteristics of motor control may be adjusted by changing the resistance distribution of resistor 1, movement of slider 2, and/or inserting another resistance between contact 4 and connecting point (a).

Motor drive control thyristors 21 and 22 are serially connected to motor unit B through diode 23. Thyristors 21 and 22 control the AC power provided to motor unit B in correspondance with the gate trigger signals. Thyristors 21 and 22 alternatively control the conduction phase of half wave AC power. The voltage waveforms at the cathode of thyristors 21 and 22 (i.e., at the anode of diode 23) are shown in FIG. 3. Voltage waveforms (a) and (b) in FIG. 3 represents the operation of thyristors 21 and 22 respectively. The voltage waveform at the cathode of diode 23 is shown in FIG. 4. The waveform at the cathode of diode 23 differs from the waveform at the anode of diode 23. The different parts 1 of the cathode waveform of diode 23 are caused by discharge of electromagnetic energy stored in field winding 6 when thyristors 21 and 22 conduct. The discharge through diode 8 provides a field current for field winding 6 for a short time interval, during which motor unit B operates as a generator. The generated output voltage is proportional to revolution speed. Thus the voltage level of the parts l, at the cathode of diode 23, corresponds to motor speed.

The voltage at the anode of diode 23 is supplied to a thyristors ON detection circuit which comprises resistors 24 and 25, capacitor 26 and NPN transistor 27. NPN transistor 27 is controlled by the cathode voltage of thyristors 21 and 22. Therefore NPN transistor 27 turns ON when thyristors 21 and 22 turn ON, and OFF when they turn OFF. The voltage at the cathode of diode 23 (FIG. 2) is supplied to a motor speed detection circuit which comprises diode 28, resistors 29 and 31, capacitor 32 and diode 33b. Capacitor 32 smoothes the input voltage through resistor 29. Either resistor 31 or 177 is connected to resistor 29 through the second mode selector switch N. Thus the voltage across capacitor 32 shows a mean proportional to the cathode voltage of diode 23. The positive terminal of capacitor 32 is connected to the collector of NPN transistor 27 through diode 33b. NPN transistor 27 is controlled by the output voltage of thyristors 21 and 22, as described herein before, and therefore the voltage waveform at the positive terminal (connection point cl) of capacitor 32 is proportional to parts 1 at the cathode of diode 23, as shown in FIG. 5. The voltage level at the connection point cl (FIG. 5) is thus proportional to motor speed, the relationship being shown in FIG. 2a. Selection of the second mode selector switch N and/or adjustment of resistor 31 or 177 will change the proportional ratio of the voltage in relation to motor speed, as shown by (a) and (b) in FIG. 2a. Curve (a) corresponds to closure of switch 30 and selection of contact N-1 of mode selector switch N. Curve (b) results when switch 30 is open and contact N-1 of mode selector switch N is selected.

The input voltage to differential or operational amplifier (hereinafter analog IC) 33a, from connection point cl through resistor 36, is adjusted by a potential divider which comprises resistors 35, 37 and 38. The voltage at connection point (a) is also supplied to analog IC 33a through resistor 34. Thus one of the inputs to analog IC 33a is the motor speed signal (FIG. 5) from connection point cl, and the other input is the motor speed indication signal (FIG. 2c) from connection point (a). Variable resistor 38 is adjusted so that the sum of the voltage at connection point (b) and the voltage at connection point cl (when the motor is stopped and slider 2 is at contact 3a) is greater than the voltage at connection point (a), and so that the former is less than the latter when slider 2 is at contact 3b.

The analog IC 33a is a comparator. The motor speed signal from connection point cl is supplied to the plus terminal of analog IC 33a, and the motor speed indication signal from connection point (a) is supplied to the minus terminal of analog IC 33a. The output of analog IC 33a is at the zero level when the motor speed indication signal level is greater than the motor speed signal level, and a positive voltage V when the former is less than the latter.

A trigger phase indication circuit, which comprises resistors 39 and 40, diodes 41 and 42, capacitor 43, resistors 44 and 45, transistor 47 and diode 46, controls the charging and discharging of capacitor 43 in correspondance with the output of analog IC 33a. The voltage across capacitor 43 controls the phase angle (of the AC power source) at which thyristors 21 and 22 are triggered, or the "trigger phase" of thyristors 21 and 22, as described hereinafter. Capacitor 43 is discharged through resistor 40 and diode 42 when the output of analog IC 33a, is at the zero level (the motor speed indication signal level is higher than the motor speed signal level), and the capacitor 43 is charged up through resistor 39 and diode 41 when the output of analog IC 33a is a positive voltage V. Thus, the voltage across capacitor 43 changes in accordance with the output level of analog IC 33a. The charging circuit (resistor 39 and diode 41) and discharging circuit (resistor 40 and diode 42) for capacitor 43 are different from each other so as to provide different time constants for charging and discharging capacitor 43 and thus accommodate trigger phase control with motor speed fluctuations caused by load fluctuation of the sewing machine. Thus, control of motor speed will be smooth. A circuit having PNP transistor 47, resistors 44, 45 and diode 46 compensates for the zero voltage interval of the motor speed signal (FIG. 5) and prevents capacitor 43 from discharging during the zero voltage interval of the motor speed signal. PNP transistor 47 turns ON when thyristors 21, 22 and transistor 27 turn ON. At this time, the cathode voltage of diode 42 rises to voltage V, which prevents the discharge of capacitor 43. The output terminal of analog IC 33a is connected to resistors 39 and 40, which in turn are connected to the anode of diode 40 and cathode of diode 42, respectively. The anode of diode 42 is connected to the cathode of diode 41 and capacitor 43. Capacitor 43 is also connected to the zero level line 18. The cathode of diode 42 is connected to the collector of PNP transistor 47 through diode 152a. The emitter of PNP transistor 47 is connected to the positive constant voltage line 19, and the base terminal is connected to resistors 44 and 45. Resistors 44 and 45 are also connected to line 19 and the anode of diode 46 respectively.

A saw-tooth oscillator circuit, which comprises diode 57, resistors 74 and 75, transistor 78, resistors 76 and 77, transistor 79, resistor 49 and capacitor 50, is energized by AC power and generates a saw-tooth wave voltage in synchronism with the AC frequency, as shown in FIG. 7, (b). The saw-tooth wave voltage has a zero level interval which corresponds to conduction of thyristors 21 and 22 as well as transistor 27. The waveform shown in FIG. 7, (b) is at connection point (f), which is the output terminal of the saw-tooth oscillator circuit. Transistor 78 turns ON and OFF in synchronism with the AC voltage and transistor 79 turns OFF and ON in the reverse mode as compared with transistor 79. Capacitor 50 is charged through resistor 49 and discharged when transistor 79 turns ON. Moreover, the capacitor 50 is discharged through diode 57 and transistor 27.

Resistors 51 and 52 are serially connected between lines 18 and 19. The intermediate connecting point (d) between resistors 51 and 52 is connected to connection point (e) through resistors 54 and 55. This connection provides capacitor 43 and analog IC 53 with a bias voltage. Analog IC 53 is a comparator to which the voltages at capacitors 43 and 50 are supplied. Resistors 54, 55 and 56 limit the electric current to analog IC 53. The minus input terminal of analog IC 53 is connected to resistors 54 and 55, and the plus input terminal is connected to resistor 56. Resistor 54 is connected to lines 19 and 18 through resistor 51 and variable resistor 52 respectively. Resistors 55 and 56 are connected to connection points (e) and (f) respectively. The output of analog IC 53 is a zero level voltage when the voltage at the minus terminal exceeds that of the plus terminal, and a positive voltage V when the former is less than the latter.

Resistors 58 and 59, NPN transistor 60, pulse transformer 61, diodes 63 and 64 and resistors 65, 66, 67 and 68 form a trigger circuit for control of thyristors 21 and 22. Transistor 60 is turned ON by a positive output voltage from analog IC 53, and current is supplied to the primary coil 61-a of pulse transformer 61. This produces a pulse voltage in secondary coil 61-b. This pulse voltage is rectified by diodes 63 and 64, regulated by resistors 65 and 66, and then supplied to the gates of thyristors 21 and 22, which are turned ON by the pulse. Turning thyristors 21 and 22 ON causes transistor 27 to conduct, which causes capacitor 50 to discharge and produces a fall in the output voltage of analog IC 53. Thus, transistor 60 turns OFF. Thus transistor 60 interrupts the current in the pulse transformer 61.

A safety circuit, comprising PNP transistor 69, resistor 70, capacitor 71 and diode 72, controls the input signal to analog IC 53. Without this circuit, thyristors 21 and 22 would turn ON and motor unit B would be energized when the AC power is turned ON, because the voltage at connection point (f) would rise faster than the voltage at connection point (e) and therefore the output voltage of analog IC 53 would rise quickly. The safety circuit prevents this undesirable operation of analog IC 53. Transistor 69 is conductive during the time constant of resistor 70 and capacitor 71, and supplies the positive voltage of line 19 to analog IC 53. The time constant of resistor 70 and capacitor 71 is predetermined so as to prevent undesirable operation of analog IC 53. Capacitor 71 is discharged through diode 72 when the AC power source is disconnected.

Pulse generator circuits are formed by resistor 101, capacitor 102 and diodes 103 and 104, by resistor 105, capacitor 106 and diodes 107 and 108, and by resistor 109, capacitor 110 and diodes 111 and 112. These pulse generator circuits produce a positive pulse of a predetermined width when resistors 101, 105 and 109, respectively, receive a positive voltage. A positive pulse appears through diode 104 when slider 2 touches contact 3a, a positive pulse appears through diode 108 when the third mode selector switch K is set at contact K-2, and a positive pulse appears through diode 112 when the third mode selector switch K is set at contact K-1.

The start detection circuit, which includes transistor 114, resistor 115, capacitor 116, and diode 117, is a pulse generator circuit which generates a positive pulse of a predetermined width when the base potential of transistor 114 falls to the zero level. This indicates that slider 2 has moved from contact 3a to resistor 1. The emitter of transistor 116 is connected to contact K-3 of the third mode selector switch K. The base is connected to contact 3a and resistor 101.

The third mode selector switch K supplies electric current to those pulse generator circuits as described above.

Diodes 118 and 119 interrupt backward flow and supply emitter current to transistor 120.

Transistors 120 and 121, diodes 122 and 123, resistors 124, 125 and 126, thyristor 127 and capacitor 128 form the timer circuit, which receives a positive pulse from the diodes 122 and 123 and turns transistor 120 OFF after a predetermined delay time (the discharge constant of capacitor 128). The anode of diode 122 is connected to the cathode of diode 117, and the anode of diode 123 is connected to resistor 113. The cathodes of diodes 122 and 123 are connected to the base of the transistor. The collector of transistor 121 is connected to line 19 and the emitter is connected to the gate of thyristor 127 through resistor 124. Resistor 125 is connected between line 18 and the gate of thyristor 127. The anode of thyristor 127 is connected to capacitor 128, and is also connected to the base of transistor 120 through resistor 126. The cathode of thyristor 127 and capacitor 128 are connected to line 18. The collector of transistor 120 is connected to the anode of the diode 129 as well as resistor 130.

The braking circuit comprises resistor 130, diodes 131 and 183, Zener diode 132, and resistors 133 and 134, as well as shunt thyristor 135. The motor unit B generates a dynamic braking force when the shunt thyristor turns ON. Zener diode 132 prevents low level error voltage from reaching the gate of shunt thyristor 135. Zener diode 132 breaks down only when shunt loops through diodes 129, 131 and 132 are interrupted, and triggers shunt thyristor 135. This interruption is controlled by the brake command circuit hereinafter described.

Transistor 136, resistors 137 and 138 and diode 178 form the "trigger phase clamp circuit," which produces a signal for triggering thyristors 21 and 22 at the appropriate phase angle (of the AC power source) when the motor is being stopped. Transistor 136 turns ON when Zener diode 132 breaks down. At this time the brake command signal appears at resistor 133. Turning transistor 136 ON shunts the charging circuit for capacitor 43. Thus capacitor 43 stops charging and the voltage across capacitor 43 remains constant. This causes a constant phase trigger pulse at pulse transformer 61.

Diode 139, resistor 140, capacitor 141, diode 142, resistors 143 through 146, analog IC 147, resistors 148 through 150 and transistor 151 form the deceleration detector circuit. Analog IC 147 is a comparator, and its inputs are the motor speed signal at connection point c2 and the predetermined reference voltage at connection point (h). The voltage at connection point c2 (capacitor 141) is proportional to the motor speed signal at connection point c1, because diode 139, resistor 140 and capacitor 141 correspond to diode 28, resistor 29 and capacitor 32 respectively. The analog IC 147 turns transistor 151 ON when the voltage at connection point c2 exceeds that of connection point (h). Namely transistor 151 turns ON when motor speed is over a predetermined value, and turns OFF when motor speed is under the predetermined value, which may be adjusted by variable resistor 146. The output of analog IC 147 is at the zero level when the voltage at connection point c2 exceeds the voltage at connection point (h). However, as described herein before, the voltage at connection point c2 falls by virtue of diode 142 when motor drive thyristors 21 and 22 as well as transistor 27 turn ON. Therefore the output voltage of analog IC 147 falls to the zero level even if the speed of the motor is higher than the predetermined value. To prevent this undesirable operation, the collector of transistor 47 (connection point i) is connected to the output of analog IC 147. The collector voltage of transistor 47 rises only when transistor 27 turns ON, as shown in FIG. 11. This prevents undesirable operation of transistor 151.

Diode 152a prevents backward flow of discharge current from capacitor 43 to resistors 148 and 149 through diode 42.

The first, second and third reed switches 153, 154 and 152 are the normally closed type, and they open when permanent magnets approach them. The third reed switch 152 is employed for thread winding detection. When the bobbin winding mechanism is operated, the reed switch 152 is opened. The first and second reed switches 153 and 154 are employed for the needle position detector means. The first reed switch 153 is opened, when the sewing needle comes to the lowered halt position, by a permanent magnet which rotates or moves in synchronism with the movement of the sewing needle. The second reed switch 154 is opened, when the thread take-up lever or the sewing needle comes to the raised halt position, by a permanent magnet which rotates or moves in synchronism with the movement of the thread take-up lever or the sewing needle. The first and second reed switches 153 and 154 are connected to the cathode of thyristor 166 through the fourth mode selector switch L. The third reed switch 152 is connected between line 18 and reed switches 153 and 154.

A first memory circuit, which comprises thyristor 155, resistors 156, 157 and 158, capacitor 159, Zener diode 160, and diode 161, clamps the potential at connection point (j) to the zero level during the time interval between the appearance of a pulse (stop signal) from capacitor 116 and the opening of reed switch 153. Zener diode 160 passes the pulse from capacitor 116 to the gate of thyristor 155, and thereby prevents an undesirable signal or voltage from reaching the gate of thyristor 155. Capacitor 159 absorbs noise or error signals and prevents thyristor 155 from conducting at an undesirable time. The cathode of thyristor 155 is connected to reed switch 153 through the fourth mode selector switch L. Therefore thyristor 155, once triggered by the pulse from capacitor 116, continues conducting until serially connected reed switch 153 opens.

The change over pulse generator circuit, comprising capacitor 162, resistor 163, diodes 164 and 165, generates a positive pulse of predetermined width when thyristor 155 turns OFF and the voltage at connection points (j) rises to the positive level of line 19. The positive pulse is supplied to resistor 113 through diode 165.

A second memory circuit, which comprises thyristor 166, resistors 167, 168 and 169, and capacitor 170, clamps the potential at connection point (k) to the zero level during the time interval between the appearance of a pulse from either diodes 104, 108, 112 or 165 and the opening of reed switches 153 or 154 or the turning OFF of transistor 151. Capacitor 170 absorbs noise signals and prevents undesirable conduction of thyristor 166. The cathode of thyristor 166 is connected to common contact L-O of the fourth mode selector switch L and to the collector of transistor 151.

The braking circuit (130-132) described above, the first memory circuit (155-161), and the second memory circuit (166-170) form the brake command circuit in this embodiment, as shown in FIG. 1.

The first switch circuit, having transistor 171 and resistors 172 and 173, is the one stitch sewing speed indication signal generator circuit. It is turned ON by conduction of thyristor 155. Thus a voltage drop appears across resistor 173 when thyristor 155 conducts. The base of transistor 171 is connected to connection point (j) through resistor 172.

The second switch circuit, having transistor 174, and resistors 175 and 176, is the predetermined constant trigger phase command signal generator circuit, in which a voltage drop appears across resistor 176 when thyristor 166 turns ON. The emitter of transistor 174 is connected to line 18, and the collector of transistor 174 is connected to the drain of FET 20 through resistor 176. The base of transistor 174 is connected to the anode (k) of thyristor 166. The predetermined constant trigger phase command signal generator circuit, together, with the first mode selector switch M as well as FET 20, governs motor speed. The voltage at connection point (a) corresponds to the resistance between slider 2 and contact 4 when contact M-1 or M-2 in the first mode selector switch M is selected. The voltage at connection point (a) corresponds to the resistance of resistor 173 when contact M-3 in the switch M is selected, and it corresponds to the resistance of resistor 173 when slider 2 is at contact 3a and transistors 171 and 174 are OFF and ON respectively. Contacts M-1 and M-2 of the first mode selector switch M are connected to contact 4 of variable resistor 1, and contact M-3 is connected to resistor 173. Common contact M-0 of the switch M is connected to the drain of FET 20.

The second mode selector switch N is used for selecting the appropriate voltage divider network for the motor speed feedback voltage (motor speed signal). This motor speed signal is supplied to capacitor 32. The common contact N-0 of the second mode selector switch N is connected to the cathode of diode 28 through resistor 29. Contacts N-1 and N-2 of the switch N are connected to variable resistor 31. Contact N-3 is connected to variable resistor 177. Resistors 31 and 177 are connected to line 18.

The first, second, third and fourth mode selector switches M, N, K and L are interconnected to be operated in synchronism. Thus if contact K-1 is selected in the third mode selector switch K, contacts M-1, N-1 and L-1 are selected at the same time in the first, second and fourth mode selector switches M, N, and L respectively. In the first position, the first contacts K-1, L-1, M-1 and N-1 are selected. This first position corresponds to a command to stop the sewing needle at the lowered halt position. In the second position, the second contacts K-2, L-2, M-2, and N-2 are selected. This second position corresponds to a command to stop the thread take-up lever or the sewing needle at the raised halt position. In the third position, the third contacts K-3, L-3, M-3 and N-3 are selected. This third position corresponds to a command to perform one stitch sewing, in which the thread take-up lever, after the foot controller is forced down, moves from its raised halt position to the lowered halt position, then returns to the raised halt position and stops.

Resistors 179 and 180, capacitor 181 and transistor 182 form a discharge circuit for capacitor 71. Transistor 182 turns ON and discharges capacitor 71 within a predetermined time interval when transistor 136 turns OFF and capacitor 181 is being charged. Resistor 179 is connected between line 19 and the collector of transistor 136. The collector and emitter of transistor 182 are connected with capacitor 71 and line 18 respectively. The base of transistor 182 is connected to the collector of transistor 136 through capacitor 181. The base and the emitter are connected to resistor 180.

The construction of the preferred embodiment shown in FIG. 1 has now been described. Operation of the preferred embodiment will be described hereinafter.

First, we assume that an AC power voltage is supplied to lines 13 and 14a, that the foot controller is not forced down and slider 2 touches contact 3a, that the first, second, third and fourth mode selector switches M, N, K and L are set at the first position (contacts M-1, N-1, K-1 and L-1 are selected to stop the sewing needle at the lowered halt position), that the third reed switch 152 is closed (this means that the sewing machine is prepared to operate in the sewing mode. Only in the bobbin winding mode will the reed switch 152 be opened.), that the sewing needle is at the lowered halt position and that the motor is at a standstill. Under these assumptions, the voltage level at connection point (a) is zero, because the resistance between line 19 and drain D of FET 20 is infinity. The voltage level at connection point c1 is zero, because the motor is at a standstill. The voltage level at connection point (b) is a predetermined value, which is adjusted by varying resistor 38 so as to operate motor unit B at the minimum motor speed when slider 2 touches contact 3b. Therefore, the sum of the voltages at connection point (b) and c1 exceeds the voltage at connection point (a). FIG. 8(a) shows voltage levels at connection points (a), (b), and c1. The output voltage of analog IC 33a (comparator) is a constant level V. Thus capacitor 43 is charged through resistor 39 and diode 41. The voltage across capacitor 43 (at connection point e) when it is charging is shown in FIG. 8 (b). the voltage across capacitor 43 will be a constant level V after a predetermined time constant which relates to the resistance of resistor 39 and capacitance of capacitor 43. The Input to the minus terminal of analog IC 53 corresponds to Ve+d, which indicates the sum of the saturated voltage level Ve across capacitor 43 and the voltage level at connection point (d). A saw-tooth wave voltage synchronized with the AC power frequency is constantly supplied to the plus terminal of analog IC 53. Resistor 49 and capacitor 50 are preliminary selected so as to obtain the relationship Ve+d>Vf, wherein Vf indicated the peak level of the saw-tooth wave voltage. The relationship between Ve+d and Vf is shown in FIG. 7(b). By this relationship, the output voltage of analog IC 53 is at the zero level. Thus the pulse transformer is not energized. Thyristors 21 and 22 are not triggered. Motor unit B is electrically separated from the AC power lines 13 and 14a by thyristors 21 and 22. Thus motor unit B is at a standstill.

Second, we assume that the foot controller is forced down slightly and slider 2 touches contact 3b. According to the change of resistance R between slider 2 and contact 4 (FIG. 2b), the voltage at connection point (a) is equal to (V−R·i), wherein V indicates the voltage level of line 19 and i indicates the constant current value which flows in FET 20. The voltage level at connection point (a) is shown in FIG. 2c. Variable resistor 38 is preliminarily adjusted such that the voltage level at connection point (a) exceeds the voltage level at connection point (b) when slider 2 touches 3b. The voltage level at connection point c1 is zero when motor unit B is at a standstill. When slider 2 touches contact 3b, the output voltage of analog IC 33a is at the zero level because the voltage level at connection point (a) exceeds the sum of the voltage levels at connection points (b) and c1. Capacitor 43 discharges through diode 42 and resistor 40, and the voltage level at connection point (e) falls gradually. Thus the sum of the voltage levels at connection points (b) and c1 falls gradually. This causes the time interval in which the voltage level at connection point (f) exceeds the sum of the voltage levels at connection points (b) and c1, as shown in FIG. 7, (b). During this time interval, the output voltage level of analog IC 53 increases to V, which energizes pulse transformer 61. Thyristors 21 and 22 are triggered by the output pulse of transformer 61. Thyristors 21 and 22 thus turn ON and maintain the ON state until the AC power voltage returns to zero level. Motor unit B is energized through thyristors 21 and 22. Rotation of armature 5 generates a voltage at connection point c1. The voltage at point c1 corresponds to motor speed. At the start of motor rotation, the sum of the voltage levels of connection points (b) and c1 is less than the voltage at connection point (a) because of low speed of the motor. This is shown as an interval $T_1$ in FIG. 6. In this interval $T_1$ capacitor 43 is still discharging and the voltage level at connection point (e) is falling. This causes the summed voltage level of connection points (e) and (d) to fall. Therefore the trigger phase of thyristors 21 and 22 leads, that is to say, the thyristors are triggered at a smaller phase angle relative to the AC supply, so that power is available to motor unit B for a larger portion of the time during each cycle of AC power. The energization time interval within a half wave of AC power is prolonged to speed up the motor. Speeding up the motor raises the voltage level at C1, by which the sum of the voltage levels at connection points (b) and c1 rises and then keeps constant, as shown by interval $T_2$ in FIG. 6. When the voltage at connection point c1 is constant (and also voltage level of point (e) is constant), the motor rotates with a constant speed. The sum voltage level Ve+d corresponding to connection points (e) and (d), as well as the ON, OFF condition of thyristors 21 and 22 are shown in FIG. 7. The sum voltage level Ve+d corresponding to connection points (e) and (d) falls in correspondance with the movement of slider 2 from contact 3a to 3b.

The motor speed signal is not present when thyristors 21 and 22 are turned ON. Therefore discharge of capacitor 43 is interrupted and the voltage level at connection point (e) is clamped during the turn-ON interval of thyristors 21 and 22 as shown in FIG. 6, (b). This interruption of discharge is obtained from the turn-ON operation of transistor 27, which is controlled by the cathode voltage of thyristors 21 and 22. Capacitor 32 discharges and transistor 47 turns ON when transistor 27 turns ON. Thus the output voltage of analog IC 33a falls to the zero level (interrupting the charging of capacitor 43), and a positive voltage V is supplied to the cathode of diode 42 to prevent discharging of capacitor 43.

Trigger pulses from pulse transformer 61 are not required during the time interval after turn-ON of thyristors 21, 22 and before the AC power voltage falls to zero level. Capacitor 50 discharges at the time when transistor 27 turns ON, by which the voltage of connection point (f) and output terminal of analog IC 53 fall to zero level to interrupt conduction of transistor 60. Thus energization of transformer 61 is prevented during the turn-ON of thyristors 21 and 22. As a result the actual voltage level at connection point (f) pulsates as shown by the dotted line in FIG. 7, (b) providing that slider 2 touches contact 3b.

Third, we assume that the foot controller is forced down deeply and slider 2 touches resistor 1. The voltage level at connection point (a) rises in correspondance with downward force on the foot controller, as shown in FIG. 2c, because slider 2 moves toward contact 4 by the downward force. This means that the motor speed indication signal exceeds the actual motor speed. Then the output voltage of analog IC 33a falls to zero level and capacitor 43 discharges. This condition corresponds to the signal level relationship as shown in interval $T_1$ in FIG. 6. At this time the sum Ve+d of the voltage levels corresponding to connection points (e) and (d) falls below the voltage level Vf at connection point (f), which causes the trigger phase of thyristors 21 and 22 to lead and thereby increases the time during which the thyristors are triggered. Thus the motor is accelerated and the voltage level at connection point c1 rises. Then the trigger phase of thyristors 21 and 22 lags and finally the motor will rotate at a balanced constant speed according to the position of slider 2. Release of the foot controller, i.e. movement of slider 2 toward contact 3b, decreases the voltage level at connection point (a). Then the voltage level at connection point c1 exceeds that of point (a), as shown in interval $T_3$ in FIG. 6. The output of analog IC 33a rises up to a positive level V and charges capacitor 43. The voltage level at connection point (e) rises. Therefore, the sum voltage level Ve+d corresponding to connection points (e) and (d) exceeds the voltage level Vf at connection point (f), by which the trigger phase of thyristors 21 and 22 lags. This causes deceleration of the motor, and the voltage level at connection point c1 falls. And, finally the motor will rotate at a balanced constant speed which corresponds to the new position of slider 2.

Figure 2D:
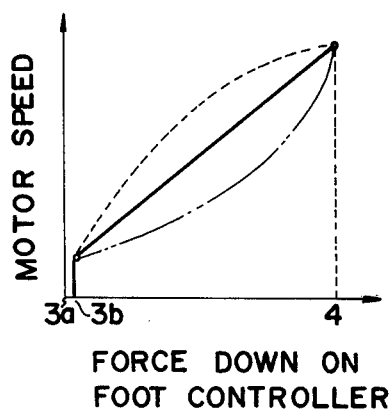
FIG. 2d is a graph which shows the relationship between downward force on the foot controller and motor speed.

As described above, the voltage level at connection point (a) corresponds to the position of slider 2, i.e. the downward force on the foot controller. The trigger phase of thyristors 21 and 22 leads or lags in correspondance with the difference between the voltage levels at connection points (a) and c1. In other words, the trigger phase of the thyristors is automatically controlled so as to balance the actual motor speed with the motor indication speed. Since the voltage level at connection point c1 is proportional to actual motor speed, as shown in FIG. 2a, and since the trigger phase control is continued until the voltage at connection point (c) is equivalent to the voltage at connection point (a), the actual motor speed is proportional to the voltage level at connection point (a). Also the voltage at connection point (a) is proportional to the resistance between slider 2 and contact 4. Consequently, the relationship between downward force and motor speed as shown in FIG. 2d can be attained by adjusting the connection between slider 2 and the foot controller pedal.

Fourth, we assume that the load on the motor fluctuates. When the motor rotates at a constant speed and the load is constant, the voltage levels at connection points (a), c1 and (e) are constant ($T_2$ mode in FIG. 6). When the load on the motor is increased, at first the motor decelerates and the voltage level at connection point c1 falls. Therefore the voltage level at connecting point (a) exceeds the voltage at connecting point c1, as shown in interval $T_1$ in FIG. 6, and the trigger phase of thyristors 21 and 22 leads. Motor unit B receives increased energy in response to the increased load. Then the speed of the motor recovers. When the motor load is too heavy to recover to the proper speed, the voltage level at connection point (e) finally falls to zero to lead the trigger phase of thyristors 21 and 22 to the most advanced electric phase angle, at which almost the full AC power is supplied to motor unit B. This means that the largest possible torque is produced even if indicated motor speed set by the position of slider 2 is the predetermined lowest one. On the other hand, if the load on the motor were lightened, the speed would rise and the voltage level at connection point c1 would increase, as shown in interval $T_3$ in FIG. 6. Therefore the trigger phase of thyristors 21 and 22 would lag to decelerate the motor until it achieves a speed which corresponds to the voltage level at connection point (a).

The safety circuit, comprising transistor 69, resistor 70, capacitor 71 and diode 72, prevents undesirable rotation of motor when AC power is supplied. If the foot controller is released completely, slider 2 touches contact 3a, and AC power is applied, then capacitor 43 and capacitor 50 begin to charge up because the output of analog IC 33a rises to voltage level V. After capacitor 43 is fully charged, the sum of the voltage levels corresponding to corresponding to connection points (e) and (d) exceeds the voltage level at connection point (f); i.e. $Ve+d>Vf$, so that pulse transformer 61 is not energized. However, Vf may exceed $Ve+d$ when capacitor 43 is charging because the time constant of the charging circuit for capacitor 43 is larger than that for capacitor 50, and the transformer may be energized to trigger thyristors 21 and 22 and thereby energize motor unit B. To prevent this, transistor 69 is biased to turn ON during a time interval which corresponds to the time constant of resistor 70 and capacitor 71. The voltage level at connection point (d) is kept at a positive level V when transistor 69 is turned ON. Thus $Ve+d>Vf$ and motor unit B is not energized when AC power is applied. Capacitor 71 discharges quickly through diode 72 when AC power is removed. Therefore, transistor 69 can turn ON the next time AC power is applied.

Fifth, we assume that the first, second, third and fourth mode selector switches K, L, M and N are set at the first position to stop the sewing needle at its lowered halt position (contacts M-1, N-1, K-1 and L-1 are selected), that the sewing machine is to be operated in the sewing mode (reed switch 152 is closed), and that the foot controller is released and slider 2 comes back to contact 3a. When slider 2 touches contact 3a the trigger pulse generator circuit, comprising resistor 101, capacitor 102, and diode 103, generates a pulse of a predetermined width and supplies it to resistor 113 through diode 104. Then transistor 121 and thyristor 127 turn ON. This discharges capacitor 128. The discharge of capacitor 128 causes transistor 120 to turn ON, and it continues conducting until capacitor 128 is charged up to voltage level V. When transistor 120 conducts, connection points (k) and (j) are connected to line 19 through diods 129, transistor 120, diode 118, contact 3a and slider 2. Thyristor 166 is also triggered by the pulse from the trigger pulse generator circuit and turns ON. Therefore the voltage level at connection point (k) falls to the zero level through thyristor 166 and transistor 151, providing that motor speed is over a predetermined braking threshold level (intervals V and W shown in FIG. 10). By this, the cathode of Zener diode 132 falls to the zero level through diode 131. Thyristor 135 is not triggered and transistor 174 turns ON. Therefore resistor 176 is connected to connection point (a) instead of to resistor 1. Then the motor speed is controlled, so as to maintain a constant speed level, by the predetermined constant trigger phase command signal generator circuit including transistor 174 and resistor 176.

The predetermined braking threshold level is determined by adjustment of variable resistor 146 in the deceleration detector circuit. The predetermined braking threshold level is selected to be above the constant speed level which corresponds to the resistance of resistor 176 of the predetermined constant trigger phase command signal generator. Therefore, the output voltage of analog IC 147 falls to zero before motor speed falls to the constant speed level, and transistor 151 of the deceleration detector circuit turns OFF. The thyristor 166 of the brake command circuit remains ON through the fourth mode selector switch L and reed switch 153 and 152. Motor speed falls to the constant speed level (intervals x and y in FIGS. 10 and 12). Then the reed switch 153 is opened when sewing needle is at the lowered halt position, by which the thyristor 166 turns OFF and the voltage level at connection point (k) rises to voltage V. Therefore transistor 174 turns OFF and Zener diode 132 breaks down to trigger thyristor 135 and transistor 136. The voltage levels at connection point (a) and c1 fall to zero when transistor 174 turns OFF and thyristor 135 turns ON. Thus the output voltage level of analog IC 33a rises to level V, so as to charge capacitor 43 through resistor 39 and diode 41. However, the anode of diode 41 is connected to zero level line 18 through diode 178 and transistor 136. This prevents the charging of capacitor 43 (voltage clamp at connection point e). Therefore, electric current flows into field winding 6 of motor unit B, and thyristor 135 conducts to provide a dynamic brake force. Thus the motor stops quickly and accurately at the position which corresponds to the lowered halt position of the sewing needle.

Thereafter, transistor 120 turns OFF after the charging time constant of resistor 126 and diode 128, by which thyristor 135 and transistor 136 are deenergized to turn OFF at the electric phase angle N shown in FIG. 7, (a). The voltage level at connection point (e) rises as capacitor 43 is charged through diode 41. On the other hand, turning transistor 136 OFF causes capacitor 181 to charge, which in turn causes transistor 182 to turn ON during the time constant of capacitor 181 and resistor 180. Turning transistor 182 ON causes capacitor 71 to discharge, which turns transistor 69 ON. Therefore the positive voltage V of line 19 is supplied to the minus terminal of analog IC 53. Transistor 60 turns OFF. In short, the trigger signal for thyristors 21 and 22 is terminated and the motor comes to a standstill when transistor 120 is turned OFF.

The above description of stop control operation is similarly applicable to the raised halt position stop control for the thread take-up lever or the sewing needle, by setting the four mode selector switches M, N, K and L at the second position (contacts M-2, N-2, K-2 and L-2 are selected). In this case, position detection by reed switch 154 triggers shunt thyristor 135, and the motor stops at a predetermined position which corresponds to the raised halt position of the thread take-up lever or the sewing needle.

Sixth, we assume that the first, second, third and fourth mode selector switches M, N, K and L are changed-over to the first or second position when the sewing machine is at a standstill. The pulse generator circuit which includes resistor 109, capacitor 110, and diodes 111 and 112 generates a pulse a predetermined width and supplies it at resistor 113 when the selector switches are changed-over into the first position. Similarly, a pulse is supplied by the pulse generator circuit which includes resistor 105, capacitor 106, and diodes 107 and 108 when the selector switches are changed-over into the second position. After generation of the pulse, operation of the sewing needle stop control, as described previously during discussion of the fifth assumption, is obtained, and the sewing needle stops at the lowered halt position or the thread take-up lever stops at the raised halt position. This occurs without operation of the foot controller.

Seventh, we assume that the selector switches M, N, K and L are set at the third position, i.e., "one stitch sewing". Voltage of level V is supplied to the emitter of transistor 120 through contact K-3 of the third mode selector switch K and diode 119 of the start detection circuit. Forcing the foot controller down turns transistor 114 of the start detection circuit to turn ON. Thus a pulse of a predetermined width is generated at diode 117. The pulse turns transistor 121 ON, then transistor 120 turns ON. Voltage of level V is supplied to thyristor 155 of the first memory circuit through diode 129 and resistor 156. At this time the first reed switch 153 has been closed, because the thread take-up lever has been at the raised halt position. Therefore, thyristor 155 of the first memory circuit is triggered ON by the pulse from diode 117. Then transistor 171 of the one stitch sewing speed indication signal generator circuit turns ON to drive motor unit B at a predetermined speed which corresponds to the phase control voltage obtained from the combination of resistor 173 and variable resistor 177. Thyristor 155 and transistor 171 turn OFF when the sewing needle comes to the lowered halt position. At this time, the voltage at connection point (j) rises to level V and a pulse appears at resistor 113 through diode 165 from the change over pulse generator circuit including capacitor 162, diode 164 and resistor 163. The capacitor 128 discharges again in correspondance with the pulse from diode 165. At this time the second reed switch 154 has been closed. Then thyristor 166 of the second memory circuit and transistor 174 of the predetermined constant trigger phase command signal generator circuit turn ON. Therefore, motor unit B is energized by a phase control voltage from the combination of resistor 176 and variable resistor 177 during the movement of the sewing needle from the lowered halt position to the raised halt position.

The second reed switch 154 is opened when the thread takeup-lever (or sewing needle) comes to the raised halt position. Then thyristor 166 of the second memory circuit turns OFF at the time when transistor 151 turns OFF. Transistor 174 of the predetermined constant trigger phase command signal generator circuit turns OFF. Thus the motor stops and thyristors 21 and 22 are turned OFF, as described hereinbefore in the fifth assumption. Operation as described in this seventh assumption is based on the assumption that the foot controller has been released and slider 2 touches contact 3a before the sewing needle comes to the lowered halt position. If the foot controller is released after the sewing needle comes to the lowered halt position, the start of dynamic braking by thyristor 135 will be slightly delayed because transistor 121 turns ON again by the pulse from the pulse generator circuit which includes resistor 101, capacitor 102 and diode 103. If the foot controller is released after the thread take-up lever stops in the raised halt position and transistor 120 turns OFF, capacitor 128 will discharge in correspondance with the pulse from the pulse generator circuit. Therefore transistor 120 turns ON in a predetermined time interval and gate current will be supplied to thyristor 135 because thyristor 166 remains OFF. However, as described above, the sum voltage level Ve+d corresponding to connection points (e) and (d) exceeds the voltage Vf at connection point (f), so that thyristors 21 and 22 are not triggered. The motor remains at a standstill. Consequently, one stitch sewing is obtained completely whenever the foot controller is forced down or released.

Eighth, we assume that the sewing needle is jammed and the sewing machine stops before the needle comes to one of the predetermined halt positions. Release of the foot controller (slider 2 returns to contact 3a) energizes the pulse generator circuit including resistor 101, capacitor 102 and diode 103. A pulse appears at resistor 113 and transistor 120, thyristor 166 and transistor 174 turn ON. Therefore motor speed falls to the constant speed level which corresponds to the resistance of resistor 176. The voltage at connection point c1 falls to the zero level because the sewing needle is jammed and the motor stops. Thus the output of analog IC 33a falls to the zero level and capacitor 43 discharges through resistor 40 and diode 42. The voltage level at connection point (e) falls, by which the trigger phase of thyristors 21 and 22 leads so as to increase the power to motor unit B. The motor may be overheated and destroyed by excess current through thyristors 21 and 22 if the motor remains in the stopped state. However, the timer circuit, which includes transistors 120 and 121, thyristor 127, capacitor 128 and resistors 124, 125 and 126, interrupts power to motor unit B before overheating occurs. Transistor 120 turns OFF a predetermined time interval after the release of the foot controller, because the voltage across capacitor 128 rises when transistor 120 conducts and then turns transistor 120 OFF. At the same time thyristor 166 and transistor 174 turn OFF. The voltage level at connection point (a) falls to zero and the output voltage of analog IC 33a rises to level V, which causes the voltage at connection point (e) to rise so as to retard triggering of thyristors 21 and 22, and finally the trigger pulse to thyristors 21 and 22 disappears. Thus motor unit B is deenergized.

When thread is wound on a bobbin, the thread winding mechanism is operated and reed switch 152 is opened. Therefore reed switches 153 and 154 have no relation to the dynamic brake control of the motor. After the foot controller is released and slider 2 touches contact 3a, the shunt thyristor 135 is triggered when transistor 151 of the deceleration detector circuit turns OFF.

When the operator rotates the driving pulley with his hand after the sewing machine stops, armature 5 in motor unit B and reed switches 153 and 154 will be operated. However, the control circuit will not operate. Thus the driving pulley can be manually operated after the sewing machine stops. The operator can shift the sewing needle at any height.

The embodiment shown in FIG. 1 and described hereinbefore comprises, in addition to a one stitch sewing control circuit system, a dynamic braking system to stop the motor at a predetermined halt position and an automatic protection circuit system to prevent overheating of the motor when the sewing needle is jammed and stops before it arrives at a predetermined halt position.

The operation of the embodiment in relation to the one stitch sewing is summarized as follows. When the first, second, third and fourth mode selector switches M, N, K and L are set at the third position, i.e., one stitch sewing, and the foot controller is forced down by an operator, a pulse is generated by the start detection circuit including transistor 114, resistor 115 and capacitor 116. Thyristor 155 of the first memory circuit is triggered to turn ON by the pulse, by which transistor 171 of the one stitch sewing speed indication signal generator circuit turns ON. The one stitch sewing speed indication signal is supplied to analog IC 33a, which is a comparator circuit, and motor drive thyristors 21 and 22 are triggered to turn ON at a predetermined phase angle so as to energize motor unit B as discussed above. Thus the motor begins to rotate. When the first reed switch 153 is opened by the magnet, which rotates in synchronism with the sewing needle, the thyristor 155 turns OFF. This turns transistor 171 of the one stitch sewing speed indication signal generator circuit OFF, and then thyristor 166 of the second memory circuit turns ON. Thus transistor 174 of the predetermined constant phase command signal generator circuit is biased to turn ON. Then the constant trigger phase command signal generator circuit, including transistor 174 and resistor 176, supplies the constant trigger phase command signal to the analog IC 33a. Then motor unit B is energized to rotate at a lower speed. Thus motor speed decreases. Thereafter, the second reed switch 154 is opened by a magnet which rotates in synchronism with the sewing needle. Transistor 174 is then biased to turn OFF, and shunt thyristor 135 is triggered to turn ON. The motor then stops by the deenergization of the transistor 174 and the dynamic braking by the thyristor 135.

The first reed switch 153 has been described as being open at the lowered halt position of the sewing needle, but it may be opened before or after the lowered halt position of the sewing needle. This means that the change-over of the motor speed in one stitch sewing may be determined in accordance with the starting characteristics of the motor and/or the sewing machine as well as the dynamic braking characteristics. It is not necessary to keep motor speed at the first or second constant level within the one stitch sewing. The one stitch sewing indication signal and the predetermined constant phase, trigger command signal may simply indicate target speeds for accelerating and decelerating the motor within the one stitch sewing.

As described above, the motor is energized to accelerate quickly at start time and thereafter decelerated to stop at a predetermined halt position smoothly and correctly. Thus acceleration and deceleration are controlled within a one stitch sewing cycle.

The foregoing disclosure represents the preferred forms of the invention. It should be understood that various modifications and alternatives may be adopted and utilized by those skilled in the art without departing from the spirit and scope of the invention, which is to be construed in accordance with the claims appended hereto.

We claim:

1. A motor control system for one stitch sewing control of a sewing machine having motor drive thyristors, a trigger phase indication circuit means for controlling operation of the motor drive thyristors and a comparator circuit means for generating a trigger phase indication signal to accelerate or decelerate motor speed into an indicated speed which corresponds to a down position of a foot controller, characterized in that the system further comprises:
   a start pulse generator circuit means for detecting the down position of the foot controller and generating a pulse;
   a first needle position detector means for detecting the arrival of the sewing needle at a first predetermined halt position;
   a second needle position detector means for detecting the arrival of the sewing needle at a second predetermined halt position;
   a first memory circuit which is energized by the pulse from the start pulse generator circuit means and which is deenergized by the first needle position detector means;
   a one stitch sewing speed indication signal generator means, which is energized by the energization of the first memory circuit, for supplying a one stitch sewing speed indication signal to the comparator circuit means;
   a second memory circuit which is energized at the time the first needle position detector means deenergizes the first memory circuit means and which is deenergized by the second needle position detector means; and
   a predetermined constant trigger phase command signal generator means, which is energized by the second memory circuit means, for supplying a predetermined constant trigger phase command signal to the comparator circuit means.

2. The motor control system for one stitch sewing control of a sewing machine as defined in claim 1, wherein the second needle position detector means is assembled to the system so as to detect the arrival of the sewing needle at the raised halt position.

3. The motor control system for one stitch sewing control of a sewing machine as defined in claim 2, wherein the first needle position detector means is assembled to the system so as to detect the arrival of the sewing needle at a predetermined position around the lowered halt position.

4. The motor control system for one stitch control of a sewing machine as defined in claim 1, wherein the system further comprises a change over pulse generator circuit means, which detects deenergization of the first memory circuit means, for generating a pulse to energize the second memory circuit means.

5. The motor control system for one stitch control of a sewing machine as defined in claim 1, further comprising a brake means for stopping the motor, and wherein the second memory circuit means generates a brake command signal which is supplied to the brake means after deenergization of the second memory circuit means.

6. The motor control system for one stitch control of a sewing machine as defined in claim 4, wherein the system further comprises a timer circuit means, which is energized by the pulse from the start pulse generator circuit means and change over pulse generator circuit means, for deenergizing the one stitch sewing speed indication signal generator means and the predetermined constant trigger phase command signal generator means after a predetermined time interval from the energization of the timer circuit means.

7. A motor control system for one stitch sewing control of a sewing machine of the type having a motor operationally connected to a needle, at least one motor drive thyristor in series with said motor, motor control means communicating with the gates of said at least one motor drive thyristor for modifying motor speed in accordance with an input signal, and a foot controller having a stop position and at least one motor drive position, wherein the improvement comprises:

a start pulse generator circuit means for generating a pulse when said foot controller is moved from said stop position to one of said at least one motor drive positions;

a first needle position detector means for detecting the presence of said needle at a first predetermined position;

a first switching circuit means for supplying a first signal as an input signal to said motor control means when said first switching circuit means is activated;

a first memory circuit means, responsive to said start pulse generator means and to said first needle position detector means, for activating said first switching circuit means between the time when said start pulse generator circuit means generates a pulse and the time when said first needle position detector means detects the presence of said needle at first predetermined position;

a change over pulse generator circuit means, responsive to said first memory circuit means, for generating a pulse when said first needle position detector means detects the presence of said needle at said first predetermined position;

a second needle position detector means for detecting the presence of said needle at a second predetermined position;

a second switching circuit means for supplying a second signal as an input signal to said motor control means when said second switching circuit means is activated; and a second memory circuit means, responsive to said change over pulse generator circuit means and to said second needle position detector means, for activating said second switching circuit between the time when said change over pulse generator circuit means generates a pulse and the time when said second needle position detector means detects the presence of said needle at said first predetermined position.

8. The motor control system of claim 7, wherein said second needle position detector means detects the presence of said needle when said needle is at the raised halt position.

9. The motor control system of claim 8, wherein said first needle position detector means detects the presence of said needle when said needle is at the lowered halt position.

10. The motor control system of claim 7, further comprising means for stopping said motor after said second needle position detector means detects the presence of said needle at said second predetermined position.

11. The motor control system of claim 7, further comprising a timer circuit means, responsive to said start pulse generator circuit means and to said change over circuit means, for preventing the activation of said first and second switching circuit means after the lapse of a predetermined time interval.

12. A motor control system for one stitch sewing control of a sewing machine having a motor, at least one motor drive thyristor in series with said motor, a needle operationally connected to said motor, and a foot controller having a stop position and at least one motor drive position, comprising:

first means for detecting the presence of said needle at a first predetermined position;

second means for detecting the presence of said needle at a second predetermined position;

third means communicating with the gates of said at least one motor drive thyristor for modifying motor speed in accordance with an input signal;

fourth means responsive to said foot controller and to said first means for supplying a first input signal to said third means between the time when said foot controller is moved from said stop position to one of said at least one motor drive positions and the time when said first means detects the presence of said needle at said first predetermined position; and fifth means responsive to said first and second means for supplying a second input signal to said third means between the time when said first means detects the presence of said needle at said first predetermined position and the time when said second means detects the presence of said needle at said second predetermined position.

13. The motor control system of claim 12, wherein said first and second means are reed switches.

14. The motor control system of claim 12, wherein said third means comprises a comparator having an input terminal to which said first and second input signals are applied.

15. The motor control system of claim 14, wherein said fourth means comprises a first thyristor which is turned ON when said foot controller is moved from said stop position to one of said at least one motor drive positions and OFF when said first means detects the presence of said needle at said first predetermined position, and wherein said fifth means comprises a second thyristor which is turned ON when said first means detects the presence of said needle at said first predetermined position and OFF when said second means detects the presence of said needle at said second predetermined position.

16. The motor control system of claim 15, wherein said fourth means further comprises a first transistor which conducts when said first thyristor is turned ON, and wherein said fifth means further comprises a second transistor which conducts when said second thyristor is turned ON.

17. The motor control system of claim 16, further comprising means for supplying a pulse to the gate of said first thyristor when said foot controller is moved from said stop position to one of said at least one motor drive positions.

18. The motor control system of claim 17, further comprising means for supplying a pulse to the gate of said second thyristor when said first thyristor is turned OFF.

19. The motor control system of claim 18, further comprising means for stopping said motor after said second thyristor is turned OFF.

* * * * *